United States Patent
Iyoki et al.

(10) Patent No.: US 7,614,287 B2
(45) Date of Patent: Nov. 10, 2009

(54) SCANNING PROBE MICROSCOPE DISPLACEMENT DETECTING MECHANISM AND SCANNING PROBE MICROSCOPE USING SAME

(75) Inventors: Masato Iyoki, Chiba (JP); Hiroyoshi Yamamoto, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 82 days.

(21) Appl. No.: 11/842,722

(22) Filed: Aug. 21, 2007

(65) Prior Publication Data

US 2008/0048115 A1 Feb. 28, 2008

Related U.S. Application Data

(63) Continuation of application No. PCT/JP2006/302315, filed on Feb. 10, 2006.

(30) Foreign Application Priority Data

Feb. 24, 2005 (JP) ............................. 2005-048261

(51) Int. Cl.
*G01B 5/28* (2006.01)
(52) U.S. Cl. ...................................................... 73/105
(58) Field of Classification Search ................. 250/306; 73/105

See application file for complete search history.

(56) References Cited

U.S. PATENT DOCUMENTS

| | | | |
|---|---|---|---|
| 5,291,012 A | 3/1994 | Shimizu et al. | |
| 5,656,769 A | 8/1997 | Nakano et al. | |
| 6,189,373 B1 * | 2/2001 | Ray | 73/105 |
| 6,229,607 B1 * | 5/2001 | Shirai et al. | 356/614 |
| 6,246,652 B1 * | 6/2001 | Kikukawa et al. | 369/53.38 |
| 6,642,517 B1 * | 11/2003 | Ghislain et al. | 250/306 |
| 6,998,602 B2 * | 2/2006 | Kamps | 250/234 |
| 7,220,962 B2 * | 5/2007 | Kawakatsu | 250/306 |
| 2004/0256552 A1 | 12/2004 | Kawakatsu | |

FOREIGN PATENT DOCUMENTS

| | | |
|---|---|---|
| JP | H04-328718 | 11/1992 |
| JP | H05-149732 | 6/1993 |

(Continued)

*Primary Examiner*—Kiet T Nguyen
(74) *Attorney, Agent, or Firm*—Brinks Hofer Gilson & Lione (57) ABSTRACT

A displacement detection mechanism for a scanning probe microscope capable of performing measurement quickly with high precision even if an objective lens or an illumination system is arranged above or below a sample or a cantilever, and a scanning probe microscope comprising it. The displacement detection mechanism (112) for a scanning probe microscope comprising a supporting section (22) for supporting a cantilever (20), a light source (114) for irradiating a reflective surface (14) with light, and a light receiving section (121) for receiving light reflected off the reflective surface (14), and detecting displacement of the cantilever (20) based on the light receiving position of the light receiving section (121), wherein the rear end of the cantilever (20) is secured to the supporting section (22), and the above light is allowed to impinge on the reflective surface (14), while inclining toward the X axis and Y axis, from above regions B and C on the distal end side of the cantilever (20) out of regions A, B, C and D sectioned, when viewed from the above, by the Y axis extending in the longitudinal direction of the cantilever (20) and the X axis passing through the reflective surface (14) and extending in the direction intersecting the Y axis perpendicularly.

20 Claims, 6 Drawing Sheets

FOREIGN PATENT DOCUMENTS

| | | |
|---|---|---|
| JP | H05-157554 | 6/1993 |
| JP | H07-181029 | 7/1995 |
| JP | 8-220114 A | 8/1996 |
| JP | H08-278317 | 10/1996 |
| JP | H10-90610 | 4/1998 |
| JP | H10-267945 | 10/1998 |
| JP | H11-271341 | 10/1999 |
| JP | 2000-346784 | 12/2000 |
| JP | 2003-114182 | 4/2003 |

* cited by examiner

SCANNING PROBE MICROSCOPE DISPLACEMENT DETECTING MECHANISM AND SCANNING PROBE MICROSCOPE USING SAME

This application is a continuation of PCT/JP2006/302315, filed Feb. 10, 2006, which claims priority to Japanese Application No. JP2005-048261, filed Feb. 24, 2005. The entire contents of these applications are incorporated herein by reference.

BACKGROUND OF THE INVENTION

1. Field of the Invention

The present invention relates to a scanning probe microscope with displacement detecting mechanism that measures various pieces of physical-property information about surface topography, viscoelasticity or the like of a sample by scanning the sample surface with the probe put in proximity thereto, and to a scanning probe microscope having the same.

2. Description of the Related Arts

As well known, the scanning probe microscope (SPM) is known as an apparatus for measuring a microscopic region of a sample, such as of metal, semiconductor, ceramic, resin, polymer, Bio material or insulator, and observing the sample as to its physical-property information of viscoelasticity, etc. or surface topography.

Of the scanning probe microscopes, there is well known a type having a cantilever in an elongate form having a reflection surface, a cantilever holder supporting the cantilever at one end, a light source for emitting light and a light receiver for receiving the light irradiated from the light source (see JP-A-2000-346784, for example).

With this structure, when light is emitted from the light source to a reflection surface, the light reflected by the reflection surface is to arrive at the light receiver. In such a case, if the cantilever has a deflection due to a concavo-convex of the sample, there occurs a deviation of arrival point to the light receiver. For this reason, by measuring such arrival points, the sample can be measured for its concavo-convex form.

Here, if a point to measure is specified by conducting an initial observation prior to a detailed measurement of the sample, detailed measurement can be proceeded with efficiency. For this purpose, an objective lens and an illumination system are arranged above or below the sample or the cantilever, to thereby obtain an optical image of the sample. Due to this, sample-surface scratches, for example, are observed to specify a point to measure.

However, where an objective lens and an illumination system are arranged above or below the sample or the cantilever in order to enhance the efficiency of measurement, less space is available in arranging the light source and the light receiver. The light from the light source could not be irradiated vertically to the reflection surface from above. In such a situation, it can be considered to obliquely irradiate the light from the light source to the reflection surface.

However, with mere oblique irradiation, the light from the light source impinges upon those elements of the objective lens, the illumination system, the cantilever holder or the base integrally formed with the cantilever, thus being obstructed from traveling. Due to this, the light could not properly arrive at the reflection surface, the light receiver or the like, thus raising a problem of making the measurement itself difficult to perform.

SUMMARY OF THE INVENTION

The present invention, made in view of such a circumstance, aims at providing a scanning probe microscope displacement detecting mechanism capable of conducting a measurement swiftly and accurately even where the objective lens and the illumination system are arranged above or below the sample or the cantilever, and a scanning probe microscope including same.

The present invention provides the following means in order to solve the foregoing problem.

A scanning probe microscope displacement detecting mechanism includes a support that supports a cantilever provided with a probe to be put in proximity to a surface of a sample, a light source that irradiates light to a reflection surface provided in the cantilever, and a light receiver that receives light irradiated from the light source and reflected by the reflection surface, thus being allowed to detect a displacement of the cantilever in accordance with a light-receiving position at the light receiver, the displacement detecting mechanism characterized in that: the cantilever has a rear end fixed to the support; from above of a region closer to a front end of the cantilever, among regions demarcated by an Y axis extending lengthwise of the cantilever as viewed from above and an X axis passing through the reflection surface and extending orthogonally to the Y axis, the light being incident upon the reflection surface obliquely to the X and Y axes.

In the SPM scanning probe microscope displacement detecting mechanism structured as above, the light from the light source is to be incident upon the reflection surface obliquely to the X and Y axes from above of a region closer to a front end of the cantilever, among regions demarcated by X and Y axes.

Due to this, open space can be utilized above the front end of the cantilever. Without obstructing from traveling the light from the light source, the light is allowed to easily reach the reflection surface.

Meanwhile, in the SPM scanning probe microscope displacement detecting mechanism, the light, incident upon the reflection surface, may be caused to reflect toward above of an opposite-side region with respect to the Y axis obliquely to the X and Y axes.

Due to this, without obstructing from traveling the reflection light from the reflection surface, the reflection light is allowed to easily reach the light receiver.

In the SPM scanning probe microscope displacement detecting mechanism, there may be comprised of travel-direction change means provided on a plane parallel with an XY plane including the X and Y axes, to change a travel direction of the light irradiated from the light source, so that the light irradiated from the light source can be changed in travel direction by the travel-direction change means.

Due to this, space can be effectively utilized on the XY plane, thus facilitating size reduction.

Furthermore, in the SPM scanning probe microscope displacement detecting mechanism, the travel-direction change means may be provided in plurality on an optical path of the light irradiated from the light source, the plurality of travel-direction change means, the light source and the light receiver being arranged nearly annularly as viewed from above in a front end region of the cantilever, so that the light from the light source can reach the reflection surface while being changed in its travel direction by a plurality of travel-direction change means, the reflection light of which can reach the light receiver. Here, because the travel-direction change means, the light source and the light receiver are arranged nearly annularly, the light is to travel nearly annularly as viewed from above in the front end region of the cantilever. Consequently, even in case an objective lens, a condenser lens or the like is arranged above the cantilever, the light is to travel without being obstructed by the objective lens, the condenser lens or the like.

Due to this, space can be utilized more effectively on the XY plane.

Furthermore, in the SPM scanning probe microscope displacement detecting mechanism, optical-path-length correcting means may be provided on an optical path of the light irradiated from the light source, to correct for a deviation of the optical path length, so that the deviation of optical-path length can be corrected by the optical-path length change means.

Due to this, even in case deviation occurs in the optical path length in between in-liquid measurement and in-the-air measurement, the deviation can be corrected swiftly and easily.

Furthermore, in the SPM scanning probe microscope displacement detecting mechanism according to the invention, an objective lens is arranged in a desired position where at least one of the probe, the cantilever and the sample is to be observed.

Due to this, the objective lens can be put in further proximity to any one of the probe, the cantilever and the sample without obstructing the objective lens by the scanning probe microscope displacement detecting mechanism. Thus, an objective lens having high NA can be provided.

Furthermore, in the scanning probe microscope displacement detecting mechanism according to the invention, illumination light is irradiated from a desired direction to at least one of the probe, the cantilever and the sample.

Due to this, initial observation can be conducted with accuracy without obstructing the illumination light by the scanning probe microscope displacement detecting mechanism.

Furthermore, in the scanning probe microscope displacement detecting mechanism, there may be comprised of a scanner that finely moves the cantilever or the sample, so that the cantilever or the sample can be finely moved by the scanner.

Due to this, the probe can be accurately scanned positively over the sample.

In the scanning probe microscope displacement detecting mechanism, the scanner may have a through-hole directed in a direction in which a Z axis orthogonal to the X and Y axes extends, wherein illumination light may be passed through the through-hole.

Due to this, initial observation can be conducted with accuracy without obstructing the illumination light by the scanner.

Meanwhile, in the scanning probe microscope displacement detecting mechanism, an objective lens may be arranged above or below the cantilever along the Z axis in a position where at least one of the probe, the cantilever and the sample is to be observed through the through-hole.

Due to this, the objective lens can be put in further proximity to any one of the probe, the cantilever or the sample without obstructing the objective lens by the scanner, thus allowing for providing an objective lens having high NA.

Meanwhile, in the scanning probe microscope displacement detecting mechanism, the scanner may have an XY scanner that finely moves the cantilever along the X and Y axes, so that the cantilever can be positively finely moved along the X and Y axes.

Meanwhile, in the scanning probe microscope displacement detecting mechanism, the scanner may have a Z scanner that finely moves the cantilever along the Z axis orthogonal to the X and Y axes, so that the cantilever can be positively finely moved along the Z axis.

Meanwhile, in the scanning probe microscope displacement detecting mechanism, the scanner may have an XYZ scanner that finely moves the cantilever along the X and Y axes and the Z axis orthogonal to the X and Y axes, so that the cantilever can be positively finely moved along the X, Y and Z axes.

Meanwhile, in the scanning probe microscope displacement detecting mechanism, the light source may be a low coherent light source.

Due to this, interference fringe can be suppressed from occurring, thus allowing for accurate measurement.

Meanwhile, in the scanning probe microscope displacement detecting mechanism, a cylindrical lens may be provided on an optical path of the light irradiated from the light source, so that the light irradiated from the light source can transmit through the cylindrical lens.

Due to this, astigmatism can be corrected, thus allowing for accurate measurement.

Meanwhile, in the scanning probe microscope displacement detecting mechanism, a collection lens may be provided on an optical path of the light reflected from the reflection surface and leading to the light receiver, so that the light reflected from the reflection surface can transmit through the collection lens.

Due to this, the spot reaching the light receiver can be in such a suitable size as coming within the light-reception surface. Moreover, where reflection light deviates due to the difference of the medium through which light is to travel or the type of the cantilever, light can be collected within a constant area to receive light.

Furthermore, in the scanning probe microscope displacement detecting mechanism, a scatter plate may be arranged in a position opposed to the probe, an objective lens being arranged in a desired position above or below the cantilever having the probe, the light irradiated from the light source being scattered by the scatter plate so that a spot is positioned in position on the reflection surface of the cantilever while observing the cantilever and the spot of scattering light through the objective lens.

Due to this, even where the light from the light source is irradiated obliquely to the optical axis of the objective lens, a light spot can be observed by observing the scattering light. The spot can be easily positioned in position on the reflection surface of the cantilever.

Meanwhile, the invention is characterized as a scanning probe microscope having the scanning probe microscope displacement detecting mechanism.

In the scanning probe microscope according to the invention, similar effects can be exhibited similarly to any of the inventions of claims 1 to 16.

According to the invention, even in case the objective lens or the illumination system is arranged above or below the sample or the cantilever, the light from the light source is allowed to easily reach a reflection surface of the cantilever without obstructing the light from traveling.

Meanwhile, because the scanning probe microscope displacement detecting mechanism can be structured thin, it is possible to use an objective lens having high NA or an illumination-system condenser lens, thus obtaining an optical microscopic image that is highly resoluble and clear. Due to this, by combining the scanning probe microscope with an optical microscope, a point-to-measure can be positioned with accuracy by the optical microscope. Thus, a scanning probe microscopic image can be measured swiftly and accurately.

BRIEF DESCRIPTION OF THE DRAWINGS

FIGS. 1-*a* and 1-*b* show a first embodiment of a scanning probe microscope according to the invention wherein FIG. 1-*a* is a front view of the scanning probe microscope while FIG. 1-*b* is a magnification view of the region designated by reference E in FIG. 1-*a*.

DESCRIPTION OF THE PREFERRED EMBODIMENTS

Embodiment 1

With reference to the drawings, explanation will be made in the below on a scanning probe microscope according to a first embodiment of the present invention. In the present embodiment, in-liquid measurement is assumed to be performed in a DFM (dynamic force mode) that scanning is made by placing the cantilever, vibrating at around the resonant frequency, in proximity to a sample while keeping the distance constant between the probe and the sample in accordance with the change amount of amplitude and phase.

Figures 1A, 1B:
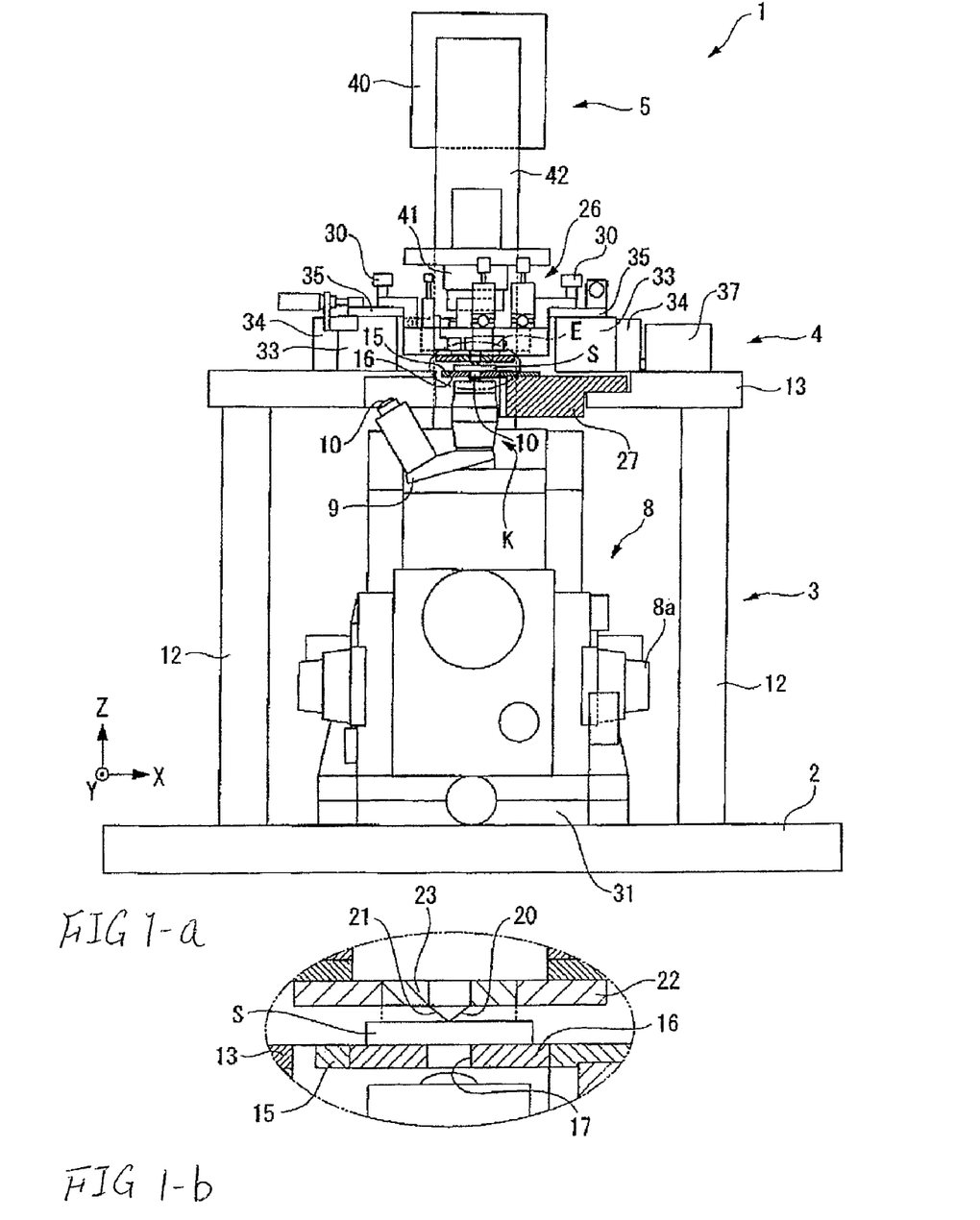

The scanning probe microscope 1, a combination with an inverted microscope, has a main body 3 set up on a anti-vibration table 2 serving as a base plate, a measurer 4 provided above the main body 3, an inverted microscope 8 provided beneath the measurer 4 and an illuminator 5 provided above the measurer 4, as shown in FIGS. 1-*a* and 1-*b*.

The inverted microscope 8 is set up on the anti-vibration table 2 through an XY stage 31. A revolver 9 is provided at an upper end of the inverted microscope 8. A plurality of objective lenses 10, different in magnification, are provided on the revolver 9. By rotating the revolver 9, the plurality of objective lenses 10 can be changed in their arrangements. The plurality of objective lenses 10 can be selectively placed in an observation site K. The observation site K refers to a position where is located below the sample S and to observe the sample S.

The main body 3 is structured with a plate-like base 13 supported by the columns 12 extending vertically from the anti-vibration table 2. A base opening 15 is formed in the center of the base 13. In the base opening 15, a stage 16 is provided to rest a sample S thereon. A stage opening 17 is formed in the center of the stage 16.

The stage 16 is to finely move in the Z-axis direction by means of a stage fine-movement mechanism 27. Incidentally, the Z axis refers to an axis passing through a reflection surface 14, referred later, and extending vertical to the surface of the sample S and the stage 16, i.e. an axis orthogonal to X and Y axes, referred later. Meanwhile, the Z-axis direction refers to a direction the Z axis extends, referring to a height direction of the scanning probe microscope 1.

Figure 2:
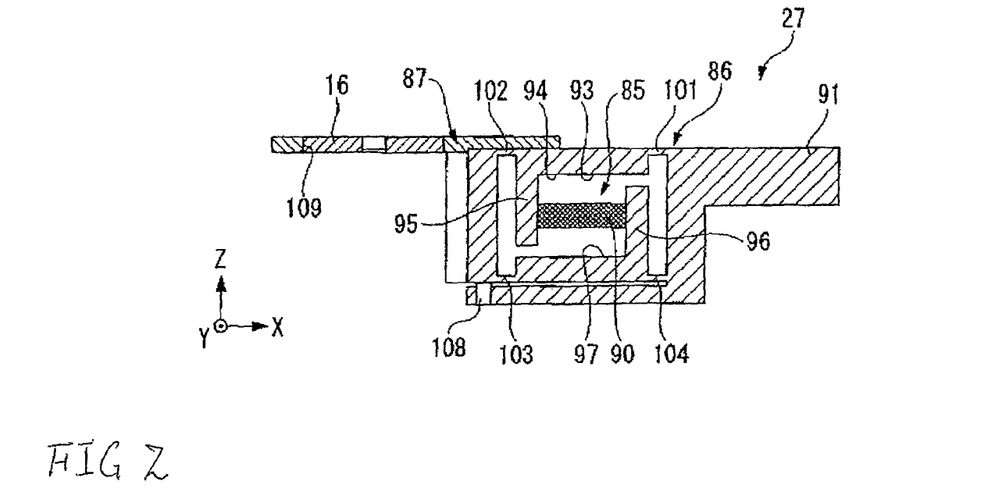
FIG. 2 is a plan view showing the stage fine-movement mechanism shown in FIGS. 1-*a* and 1-*b* with magnification.
Figure 3:
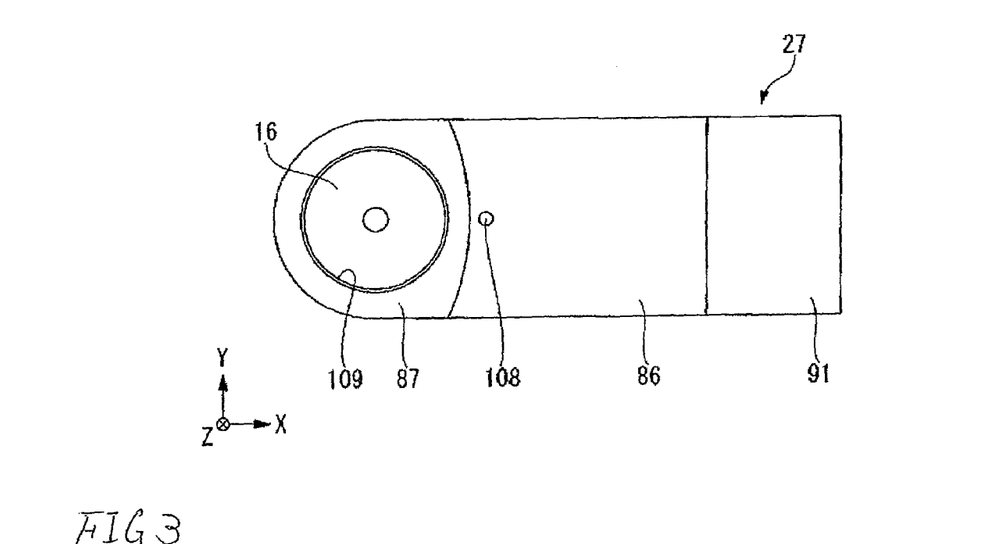
FIG. 3 is a bottom view showing the stage fine-movement mechanism shown in FIG. 2.

The stage fine-movement mechanism 27 has a mechanism body 86 formed nearly rectangular and an extension 87 that extends in a direction (i.e. in the X-axis direction) transvering the thickness-wise (i.e. Z-axis direction) of the mechanism body 86, as shown in FIGS. 2 and 3.

The stage 16 is provided in the extension 87.

The mechanism body 86 is provided with a body mount 91 extending in a direction opposite to the extension 87. The body mount 91 is fixed on a predetermined position of the base 13 shown in FIG. 1, thereby cantilever-supporting the mechanism body 86.

Meanwhile, a cavity 93 is provided in the mechanism body 86. A first parallel spring 101 is provided at one of the X-axis directional ends of an upper inner wall 94 of the cavity 93 closer to the provision of the body mount 91 while a second parallel spring 102 is provided at the other end closer to the provision of the extension 87. Meanwhile, a third parallel spring 103 is provided at one of the X-axis directional ends of a lower inner wall 97 closer to the extension 87 while a fourth parallel spring 104 is provided at the other end closer to the provision of the body mount 91. In the vicinity of the second parallel spring 102, a downward wall 95 is provided extending lower from the upper inner wall 94. In the vicinity of the fourth parallel spring 104, an upward wall 96 is provided extending upper from the lower inner wall 97. Namely, the downward wall 95 and the upward wall 96 are oppositely arranged extending in opposite directions to each other.

A Z driver 85 is provided between the downward wall 95 and the upward wall 96. The Z driver 85 is provided physically separate from the X and Y drivers 52, 51 referred later so that those are to function independently. The Z driver 85 is made by a Z-side piezoelectric element 90 of a lamination type directed in the X-axis direction. The Z-side piezoelectric element 90 has one end fixed to the downward wall 95 and the other end fixed to the upward wall 96.

With this structure, if voltage is applied to the Z-side piezoelectric element 90, the Z-side piezoelectric element 90 expands and contracts in the X-axis direction. When the Z-side piezoelectric element 90 expands, the downward and upward walls 95, 96 are depressed outward with respect to the X-axis direction. The upward wall 96 rotates clockwise in FIG. 2 about the fixed end and the around while the downward wall 95 rotates clockwise about the fixed end and the around with a result that the extension 87 is moved in the Z-axis direction while being guided by the first to fourth parallel springs 101, 102, 103, 104. Thus, the stage 16 coupled to the extension 87 is moved in the Z-axis direction.

Incidentally, reference numeral 108 represents a capacitance-type sensor. By detecting the fine-movement amount of the mechanism body 86 through use of the capacitance-type sensor 108, it is possible to detect a Z-axis directional fine displacement of the stage 16 or to linearly move the stage 16 in response to the voltage applied to the Z-side piezoelectric element 90 in accordance with a detected displacement.

Figure 4:
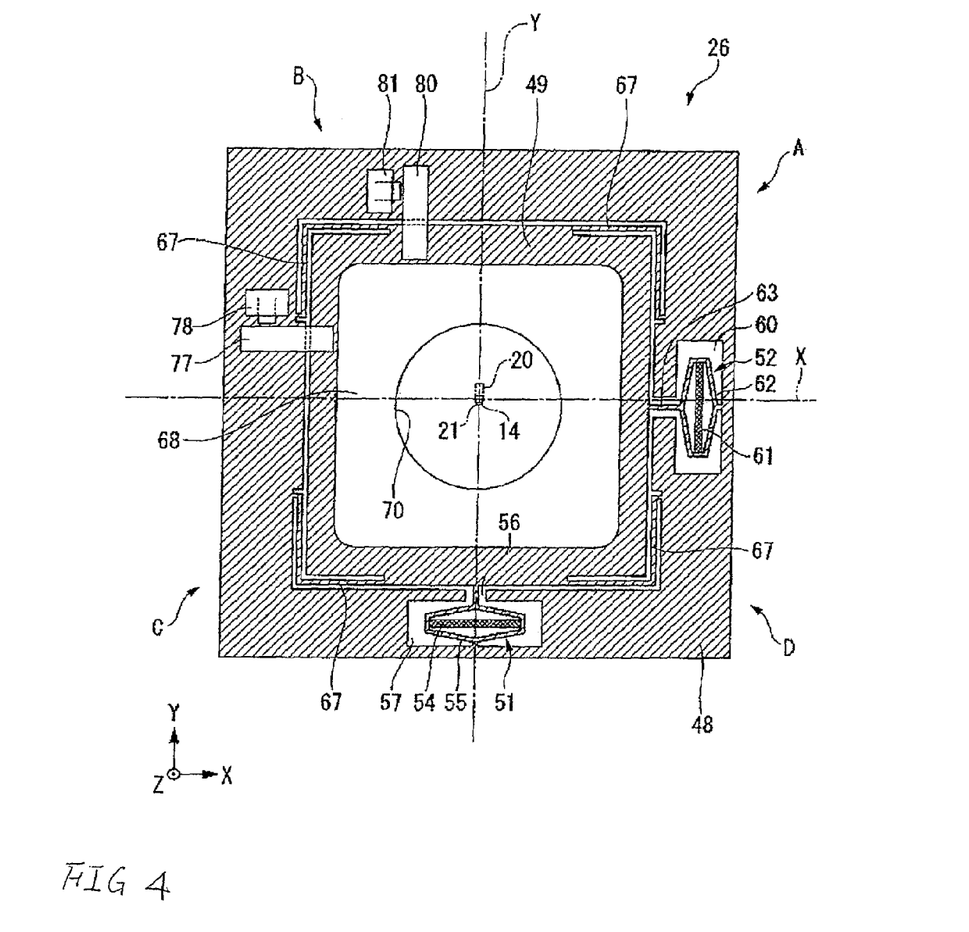
FIG. 4 is a plan view showing the probe fine-movement mechanism shown in FIGS. 1-*a* and 1-*b* with magnification.

Furthermore, as shown in FIGS. 1(*a*) and (*b*), the measurer 4 is set up on the upper surface of the stage 16. The measurer 4 has a probe fine-movement mechanism (XY scanner) 26. The probe fine-movement mechanism 26 is provided with a crank mount 30 made in a crank form. By means of the crank mount 30, the probe fine-movement mechanism 26 is arranged coincident at the center thereof with the stage opening 17. Furthermore, the probe fine-movement mechanism 26 has an outer frame 48 and an inner frame 49 that are rectangular in form different in widthwise dimension, as shown in FIG. 4. The outer and inner frames 48, 49 are formed flat of cast iron low in thermal expansion. Meanwhile, the outer frame 48 and the inner frame 49 are coupled concentrically with each other through an Y driver 51 and X driver 52. The top face of the outer frame 48 and the inner frame 49 are arranged at the surfaces thereof. The Y driver 51 is arranged within a Y-side cavity 57 formed extending in the X-axis direction in the outer frame 48 while the X driver 52 is arranged within an X-side cavity 60 extending in the Y-axis direction similarly.

The Y driver 51 has a Y-side piezoelectric element 54 of a lamination type directed in the X-axis direction. The Y-side piezoelectric element 54 is provided with a Y-side displacement increasing mechanism 55, nearly rhombus as viewed from above, surrounding the peripherals. The Y-side displacement increasing mechanism 55 is coupled to the inner frame 49 through the Y-side coupling 56.

The X driver 52 has an X-side piezoelectric element 61 of a lamination type directed in the Y-axis direction. The X-side piezoelectric element 61 is provided with an X-side displacement increasing mechanism 62, nearly rhombus similarly to the above, in the periphery thereof. The X-side displacement increasing mechanism 62 is coupled to the inner frame 49 through the X-side coupling 63.

At the four corners of the inner frame 49, parallel springs 67 are arranged. A generally rectangular base plate 68 is provided on a bottom surface of the inner frame 49 wherein the base plate 68 is provided parallel with the XY plane including the X and Y axes. Below the base plate 68, a cantilever 20 is provided supported by a cantilever holder (support) 22 as referred later.

With this structure, by applying voltage to the Y-side and X-side piezoelectric element 54, 61, the Y-side and X-side displacement increasing mechanisms 55, 62 expand/contract respectively in the Y and X-axis directions, thereby finely vibrating the inner frame 49 in the Y and X directions and finely moving the cantilever 20 in the Y and X-axis directions through the base plate 68.

Here, the Y axis refers to an axis extending lengthwise of the cantilever 20 as viewed from above, i.e. refers to a straight line that the cantilever 20 is projected onto a desired horizontal surface. The Y-axis direction refers to a direction the Y axis extends, referring to a depthwise direction of the scanning probe microscope 1.

Meanwhile, the X axis refers to an axis passing through the reflection surface 14 and extending in a direction orthogonal to the Y axis on the desired horizontal plane. The X-axis direction refers to a direction the X axis extends, referring to a widthwise direction of the scanning probe microscope 1.

The four regions demarcated by the X and Y axes are assumed respectively referred to as A, B, C and D regions (1st Quadrant, 2nd Quadrant, 3rd Quadrant and 4th Quadrant) in the counterclockwise order from the upper right region in FIG. 4 as viewed from above. Namely, taking the X and Y axes as coordinate axes, the first quadrant is referred to as A region, the second quadrant as B region, the third quadrant as C region and the fourth quadrant as D region. The A and B regions are arranged closer to the base of the cantilever 20 while C and D regions are arranged closer to the front end thereof.

Reference numerals 78, 81 represent capacitance-type sensors while reference numerals 77, 80 represent targets. By detecting the fine movement amounts in the Y and X axis directions of the inner frame 49 by means of the capacitance-type sensors 78, 81, calculated are fine-movement amount errors in the Y and X axis directions of the cantilever 20 through the inner frame 49 so that the inner frame 49 can move linearly in response to the voltage applied to the Y-side and X-side piezoelectric elements 54, 61.

Figure 6:
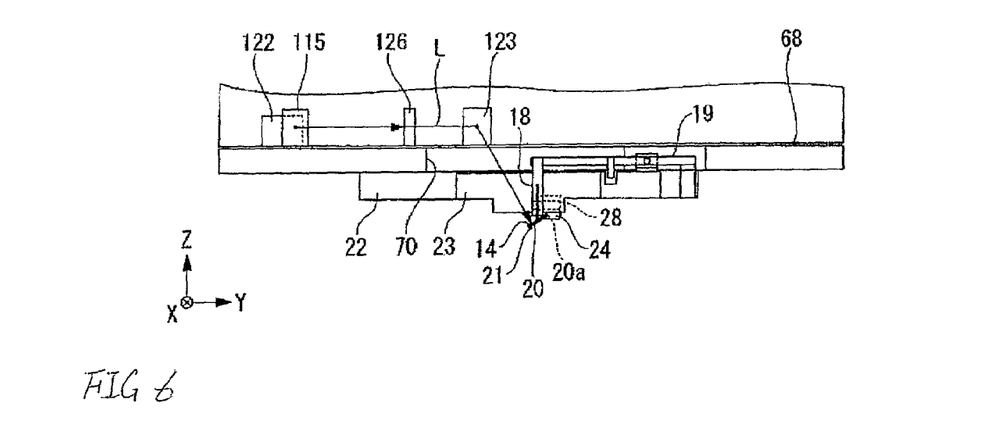
FIG. 6 is an explanatory view showing a manner that light is incident upon a reflection surface, by the displacement detecting mechanism of FIG. 4.

Meanwhile, the cantilever holder 22 is provided with a glass-made glass holder 23 at the center thereof, as shown in FIG. 6. The glass holder 23 is to form a liquid viscous film between the sample S and the glass holder 23, thereby preventing the irregular reflection, etc. of the light from the light source of a displacement detecting mechanism 112, referred later, or of the illumination light from the light source 40. The cantilever holder 22 is provided with a support member 19 extending in a columnar form along the Y axis. The support member 19 has, at its front end, a downward member 18 extending downward from the front end. The downward member 18 at its lower end is provided with a wire, not shown.

The cantilever 20 is provided above the stage opening 17. The elongate cantilever 20 has a front end-sharpened probe 21 provided at the lower surface of the front end thereof. At the upper surface, a reflection surface 14 is provided to reflect light. The cantilever 20 has a rear end 20a resting upon a support table 24 adhesive-fixed to the glass holder 23 through the piezoelectric element 28 and fixed on the support table 24 by the wire provided at the downward member 18. Due to this, the cantilever 20 is cantilever-supported such that the front end thereof at which the probe 21 is provided serves as a free end.

In the cantilever holder 22 thus structured, by applying voltage to the piezoelectric element 28, the cantilever 20 is vibrated at a predetermined frequency and amplitude along the Z axis direction.

In the vicinity of the probe fine-movement mechanism 26, a Z rough-movement mechanism 33 is provided to roughly move the cantilever 20 in the Z axis direction by means of a motor 37, as shown in FIGS. 1a and 1-b. The Z rough-movement mechanism 33 is fixed at its base member 34 on the base 13 of the main body 3. An XY stage 35 is provided on an upper surface of the Z rough-movement mechanism 33 while the crank mount 30 is fixed on an upper surface of the XY stage 35.

Furthermore, the illuminator 5 is provided above the probe fine-movement mechanism 26. The illuminator 5 has a light source 40 for emitting illumination light and a condenser lens 41 for collecting the illumination light from the light source 40. The condenser lens 41 is arranged above the center of the probe fine-movement mechanism 26 by means of the lens support 42 continuing with the inverted microscope 8 and supported for vertical movement relative to the probe fine-movement mechanism 26.

Figure 5:
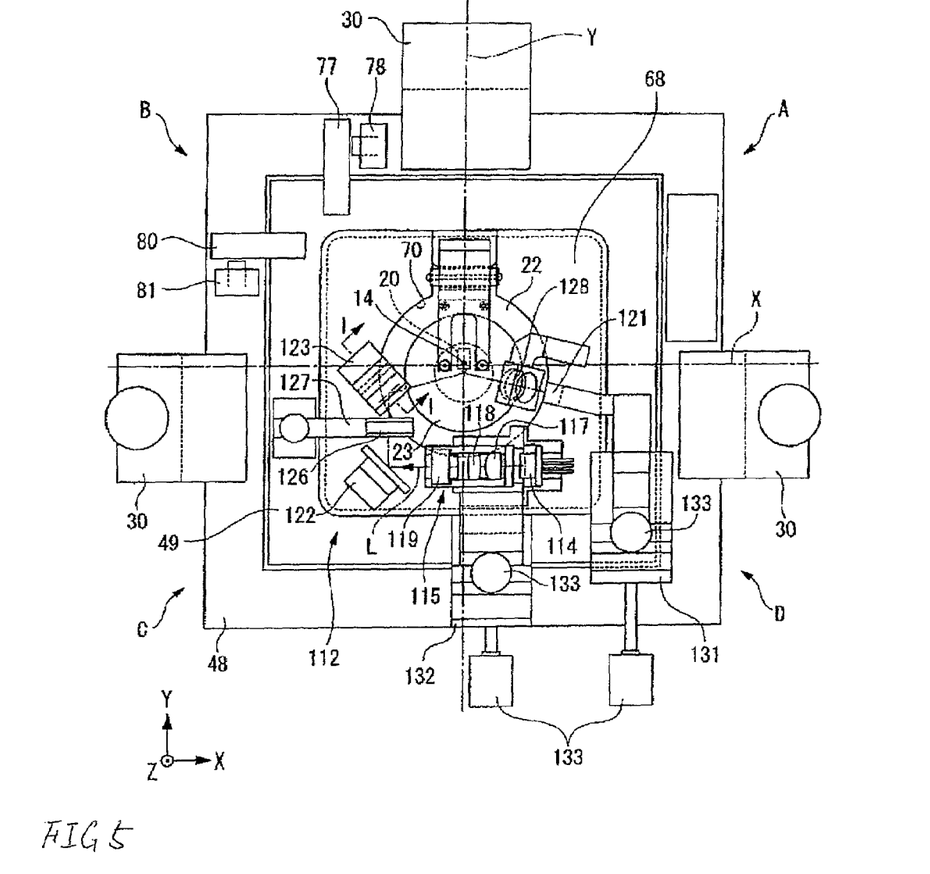
FIG. 5 is a plan view showing a manner that a displacement detecting mechanism is provided in a the probe fine-movement mechanism of FIG. 4.

Furthermore, the probe fine-movement mechanism 26 in this embodiment is structured, on an upper surface of the base plate 68, with a displacement detecting mechanism 112 for detecting a displacement of the cantilever 20 as shown in FIG. 5. The displacement detecting mechanism 112 has a super luminescence diode (hereinafter, referred to as an "SLD") 114 having a near-infrared light wavelength of 830 nm as a low coherent light source. The SLD (light source, low-coherent light source) 114 is arranged close to the corner arranged in the D region among the four corners of the base plate 68. When the SLD 114 is driven, low-coherent light is emitted traveling along the X axis toward the opposite region with respect to the Y axis, i.e. toward the C region. An optical system 115 is arranged on the path of the light from the SLD 114, in a position close to the SLD 114. The optical system 115 has a focusing aspheric lens 117 arranged opposite to the SLD 114. An achromatic lens 118 and a cylindrical lens 119, for correcting aberrations, are arranged in the order of from the D region to the C region.

The optical system 115 is structured with lens groups 117, 118, 119, whose exiting light is to be focused on the reflection surface 14 of the cantilever 20.

The cylindrical lens 119 is provided for correcting astigmatism, to correct for the spread of a focus spot onto the reflection surface 14.

Figure 7:
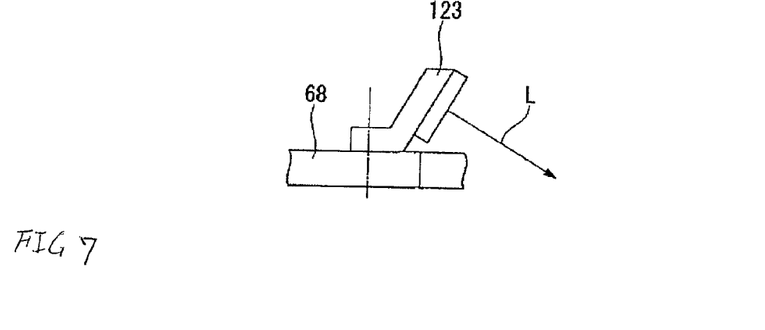
FIG. 7 is a view as viewed along line I-I in FIG. 5.

A first reflector (travel-direction change means) 122 is provided in a position close to the corner arranged in the C region among the four corners. The first reflector 122 is arranged along the SLD 114, the optical system 115 and the X axis so that the light from the SLD 114 can transmit through the optical system 115 and reach the first reflector 122. Furthermore, the first reflector 122 reflects the arrival light and changes the travel direction thereof, thus allowing the reflection light to travel along the Y axis. Furthermore, a second reflector (travel-direction change means) 123 shown in FIGS. 5 and 7 is provided in a position close to the X axis in the C region. Between the first reflector 122 and the second reflector 123, there is provided a correction glass (light-path correcting means) 126 in a plate form. Namely, the first reflector 122, the correction glass 126 and the second reflector 123 are arranged along the Y axis.

The correction glass 126 is supported removably from the optical path by the glass support 127. In case the correction glass 126 is attached in a predetermined position, the reflection light from the first reflector 122 is to transmit through the correction glass 126. Between attaching and removing the correction glass 126, optical-path length changes depending upon the presence/absence of a refraction due to the correction glass 126.

Here, optical-path length differs between a measurement in a liquid and a measurement in the air. This is because the incident light, upon the reflection surface 14, is to refract upon transmitting a culture solution. In this embodiment, setting is made to an optical-path length suited for in-liquid measurement by a transmission through the correction glass 126 while setting is made to an optical-path length suited for in-the-air measurement by removing the correction glass 126.

The second reflector 123 further reflects the reflection light from the first reflector 122 and changes the travel direction thereof so that the reflection light can exit toward the reflection surface 14.

Meanwhile, in a position of the D region close to the cantilever 20 and on the optical path of the reflection light from the reflection surface 14, there are provided a collection lens 128 formed as a double-convex lens, for example, to collect the reflection light and a photodetector (light receiver) 121 structured split, say, into four parts.

The SLD 114, the optical system 115, the first reflector 122, the correction glass 126, the second reflector 123, the reflection surface 14, the collection lens 128 and the photodetector 121 are arranged nearly annularly throughout the C and D regions as viewed from above.

With this structure, the reflection light from the second reflection surface 123 enters the reflection surface 14 obliquely relative to the X and Y axes from above the C region, and then exits therefrom obliquely relative to the X and Y axes toward the above of the D region, as shown in FIGS. 5 and 6.

For example, in this embodiment, the second reflector 123 is set up such that its reflection surface assumes at an angle of 60 degrees relative to the Z axis and 48 degrees relative to the Y axis. Due to this, the light reflected upon the second reflector 123 is to enter the reflection surface 14 obliquely at 50 degrees relative to the Z axis and 15 degrees relative to the X axis. Meanwhile, the arrangement angle of the cantilever 20 is established at 9 degrees relative to the Y axis.

Incidentally, those angles are not limited to the above setting but can be changed properly. Particularly, the incident light upon the reflection surface 14 is preferably established at greater than 0 degrees and 45 degrees or smaller relative to the X axis.

Furthermore, the displacement detecting mechanism 112 has a light-reception-side YZ stage 131 that moves the photodetector 121 in the Y and Z-axis directions and a light-source-side YZ stage 132 that moves the SLD 114 and optical system 115 in the Y and Z-axis directions. The light-reception-side YZ stage 131 has a lever 133. By operating the lever 133, the photodetector 121 can be adjusted in position relative to the Y and Z axes. Likewise, by the light-source-side YZ stage 132, the SLD 114 and optical system 115 can be adjusted in position relative to the Y and Z axes.

Meanwhile, a probe-side through-hole 70 directed to the Z axis is formed in the center of the base plate 68 in this embodiment. The illumination light, from the light source 40 shown in FIG. 1, is to be passed through the probe-side through-hole 70.

Meanwhile, as shown in FIG. 2, a stage-side through-hole 109 is formed in the Z direction in the extension 87 according to the present embodiment. Furthermore, by operating the focusing dial 8a provided on the inverted microscope 8 shown in FIG. 1, the objective lens 10 is moved vertically so that the sample S can be observed by means of the objective lens 10 through the stage-side through-hole 109.

Now explanation is made on the function of the scanning probe microscope 1 in the present embodiment thus constructed.

At first, a sample S is put on the stage 16 through an in-liquid cell, not shown. Then, the light source 40 is put on, to irradiate illumination light to the sample S. Thereupon, the illumination light passes through the probe-side through-hole 70 and transmits through the glass holder 23 of the cantilever holder 22 and the sample S in the order. By passing through the stage-side opening 17, the light reaches the objective lens 10 arranged in the observation site K. Due to this, the sample S can be observed in its state through the objective lens 10. When rotating the revolver 9 at this time, the first objective lens 10 goes out of the observation site K, to place another objective lens 10 in the observation site K. This allows for selecting a proper magnification of objective lens 10. Meanwhile, when operating the focusing dial 8a, the objective lens 10 moves up so that the objective lens 10 can near the sample S into a focusing.

Due to this, initial observation is made on the sample S. In accordance with the result, a detailed point to measure is specified to conduct a detailed measurement with the scanning probe microscope. For the relevant point to measure, alignment is made by moving the inverted microscope 8 through the XY stage 31.

When conducting a detailed measurement, the correction glass 126 is first attached. Furthermore, alignment is made between the surface of the sample S and the position of the probe 21 by use of the XY stage 35 while viewing the image by means of the inverted microscope 8. Then, the SLD 114, the optical system 115 and the photodetector 121 are adjusted in position. Namely, as shown in FIG. 5, positional adjustment is made with the light-source-side YZ stage 132 such that the light L emitted from the SLD 114 is positively incident upon the reflection surface 14. Meanwhile, positional adjustment is made with the light-reception-side YZ stage 131 such that the spot comes onto the photodetector 121. Then, the motor 37 is driven for the Z rough-movement mechanism 33 to roughly move the cantilever 20 thereby submerging the cantilever 20 in the in-liquid-cell culture solution. Then, the probe 21 is positioned in proximity to the surface of the sample S.

Figure 8:
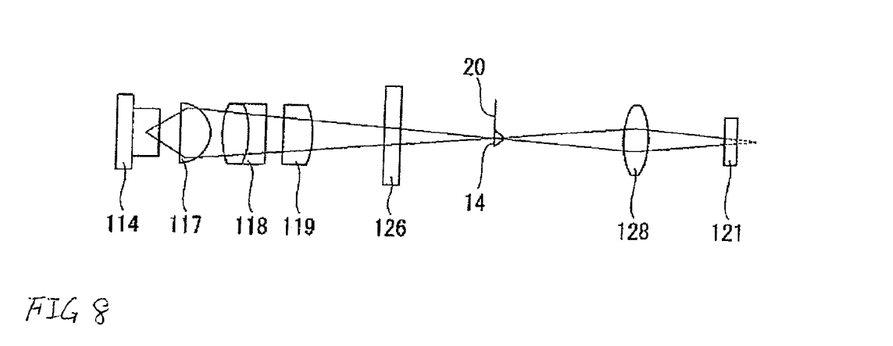
FIG. 8 is an optical path diagram that the optical path of the displacement detecting mechanism of FIG. 5 is developed on a straight line by partial simplification.

Here, light travel state is explained while referring to FIGS. 5, 6, 8 and 9. Incidentally, FIG. 8 shows a development of the optical path over a straight line with mediums omitted around the first reflector 122, the second reflector 123, the glass holder 23 and the cantilever 20. Accordingly, the actual state of refraction is not reflected upon.

Driving the SLD 114, low-coherent light L is emitted from the SLD 114 so that the light L travels along the X axis toward the C region. The light L transmits through the aspheric lens 117 into a collected state, and then transmits through the achromatic lens 118. Corrected for aberration by the transmission through the achromatic lens 118, the light passed the achromatic lens 118 is to transmit a cylindrical lens 119. By the transmission through the cylindrical lens 119, correction is made for astigmatism.

Furthermore, the light L, transmitted through the cylindrical lens 119, reaches the first reflector 122. The light L reflects thereupon toward the B region, thus traveling along the Y axis and transmitting through the correction glass 126. By the transmission through the correction glass 126, the light L is refracted to change the optical-path length thus providing an optical-path length suited for in-liquid measurement.

Furthermore, the light L passed the correction glass 126 reaches the second reflector 123 and reflects thereupon. The reflection light is inclined a predetermined angle relative to the X, Y and Z axes and focused onto the reflection surface 14 from above the C region. In this embodiment, the SLD-based spot has a size having a diameter of approximately 10 μm on the reflection surface 14. The light L, incident upon the reflection surface 14, reflects there and travels toward the D region while spreading again. Namely, it is inclined a predetermined angle relative to the X, Y and Z axes, to travel toward the above of the D region. By the transmission through the collection lens 128, the light L from the reflection surface 14 is focused onto the photodetector 121.

In this manner, the light L emitted from the SLD 114 travels nearly annularly throughout the C and D regions as viewed from the above.

Here, the reflection surface 14 has a position changing depending upon the type of the cantilever 20 and the attaching error onto the cantilever holder 22. In addition, light refraction occurs due to the medium (liquid or air) between the glass holder 23 and the sample S, to change the incident angle upon the reflection surface 14 and causing a deviation of imaging point on the XY plane. Besides, the imaging point is also changed in the optical axis direction. In this case, by moving the SLD 114 and optical system 115 by means of the light-source-side YZ stage 132, the imaging point can be moved within the XY plane, thus making it possible to focus the SLD 114 spot on the reflection surface 14. Furthermore, the optical-path length can be changed by the correction glass 126, thus enabling correction for imaging point in the optical-axis direction between different mediums.

Here, in the case of positioning the light L emitted from the SLD 114 in position on the reflection surface 14 of the cantilever 20, positional adjustment is made while observing the cantilever 20 and the light L spot in a common field of view by means of the objective lens 10 provided on the inverted microscope. Because the light L spot, prior to positioning, is in a position significantly deviating from the reflection surface 14 of the cantilever 20, positioning is easy to perform if a certain degree of field-of-view area is secured. For this reason, observation was conducted with an objective lens having a magnification of ×4 in this embodiment.

Figure 9:
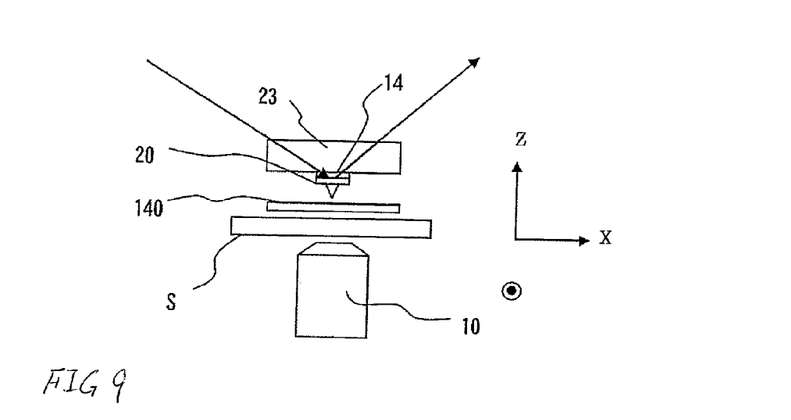
FIG. 9 is an optical path diagram that an incident ray of light upon a cantilever reflection surface is projected onto an X-Z plane.
Figure 10:
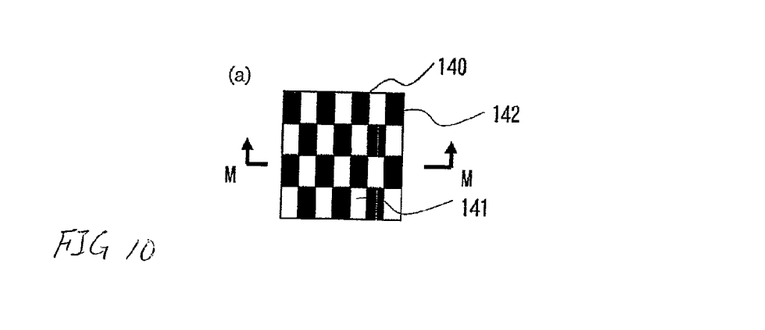
FIG. 10 is a plan view of a scatter plate.

Here, in FIG. 9 is shown an optical-path diagram that the incident beam upon the reflection surface 14 of the cantilever 20 is projected onto the X-Z plane. As can be seen from the figure, because incident light is in a state of dark-field illumination upon a solid angle of the objective lens 10, no light enters the objective lens 10 thus making it difficult to observe the spot. Consequently, in the invention, a gap is previously provided by means of the Z rough-movement mechanism 33 between the cantilever 20 and the sample S in which a scatter plate 140 is inserted. By observing the spot of the light scattered at the scatter plate 140 and the cantilever 20 through the objective lens 10, the spot is aligned onto the reflection surface 14. Then, the scatter plate 140 is removed to put the probe 21 in proximity to the sample S by means of the Z rough-movement mechanism 33. In the positioning with the scatter plate 140, a culture liquid is filled between the scatter plate 140 and the glass holder 23 in order to prevent the deviation of optical path. The scatter plate 140 used had a 20-nm thick chromium film 142 provided in a 2 μm-pitch lattice form over a glass substrate 141 as shown in FIG. 10. By using the scatter plate 140 like this, the cantilever 20 can be observed through the glass substrate 141 in the areas the chromium film is absent. Meanwhile, the spot is scattered through the areas with the chromium film 142 so that the scattering light can be focused by the objective lens 10, to enable spot observation.

The SLD 114 is for near-infrared light having a wavelength of 830 nm. By using near-infrared light, there is a merit that fluorescence is less excited during a measurement of a biosample or so. Where observing a spot through the objective lens 10, a CCD camera (not shown) is used in consideration of safety. Since the CCD camera has a sensitivity also in the infrared region, observation can be conducted with the other region of light than visible light.

Incidentally, the scatter plate 140 may be disposed between the objective lens 10 and the underside of the sample S. Meanwhile, spot observation may be by a reflective microscope arranged immediately above the sample S.

Meanwhile, the reflection light from the reflection surface 14 has a reflection angle different depending upon the difference of the incident angle while the reflection light has a refractive angle changing with the difference of the medium. Accordingly, the optical path of the reflection light is not fixed unambiguously. Meanwhile, the light after focused on the reflection surface 14 is to spread again.

Where detecting a reflection light spot on the photodetector 121 under such conditions, the photodetector 121 is positioned on a ray of light traveling in a desired direction, thus requiring to prepare a light-reception-side YZ stage 131 capable of being positioned over a broad range. Meanwhile, in order to converge the spreading ray of light to the light-receiving surface on the photodetector 121, there is a need to prepare a photodetector having a broad area. If taking such a structure, the apparatus increases in size thus reducing the measurement accuracy of the scanning probe microscope. In addition, alignment is very difficult to perform.

For this reason, by arranging the collection lens 128 in a suitable position on the optical path from the reflection surface 14 to the photodetector 121 surface, the light is collected toward the photodetector 121, thus allowing for selecting such a suitable spot size as converged within the photodetector 121 surface. Furthermore, the ray of light can be refracted by the collection lens 128 to thereby collect the spot within a particular area. This structure can size-reduce the photodetector 121 and the light-reception-side YZ stage 131, making it easy to position the photodetector 121.

Here, when the cantilever 20 deflects in the Z axis direction, the spot on the photodetector 121 surface depicts an arcuate path. At a small amount of deflection, it moves linearly in a direction inclining approximately 15 degrees relative to the Y axis. Meanwhile, where used on a friction force microscope, cantilever twist is to be detected about the major axis of the cantilever 20. Where the cantilever is twisted, movement is on the Y-Z plane in a direction nearly orthogonal to the deflection path.

In this state, voltage is applied to the piezoelectric element 28, to vibrate the probe 21 at a predetermined frequency and amplitude along the Z axis direction through the cantilever 20. Then, voltage is applied to the Y-side piezoelectric element 54 and X-side piezoelectric element 61 shown in FIG. 4. Thereupon, the Y-side and X-side piezoelectric elements 54, 61 expand/contract to finely move the inner frame 49 in the XY-axis directions through the Y-side and X-side displacement increasing mechanisms 55, 62. Due to this, the probe 21 raster-scans at a predetermined scanning rate over the sample S.

At this time, when the inner frame 49 finely moves in the X and Y-axis directions, the capacitance-type sensors 78, 81 detect the fine movement amount in the X and Y axis directions, to correct for errors in the X and Y axis directions. By thus correcting the fine movement amounts in the X and Y axis directions, linear operation can be made in the X and Y axis directions without affected by the hysteresis or creep of the Y-side and X-side piezoelectric elements 54, 61.

In the scanning, in case the distance changes between the probe 21 and the sample S surface in accordance with the concavo-convex of the sample S, the probe 21 experiences a repellent or attractive force due to an atomic force or an intermittent contact force, thus changing the vibration state of the cantilever 20 and hence the amplitude and phase thereof. Where the photodetector 121 uses a detector split into four parts at its light-receiving surface, the change of amplitude or phase is to be detected as an output difference (referred to as a DIF signal) from different two pairs of split surfaces of the photodetector 121. The DIF signal is inputted to a Z-voltage feedback circuit, not shown. The Z-voltage feedback circuit applies a voltage to the Z-side piezoelectric element 90 shown in FIG. 2 such that the amplitude and phase becomes equal according to the DIF signal.

The Z-side piezoelectric element 90 is repeatedly expanded and contracted at high speed by the application of voltage. When the Z-side piezoelectric element 90 expands and contracts, the stage 16 moves at very high frequency in the Z-axis direction through the extension 87, to move the sample S on the stage 16 in the Z-axis direction. Due to this, in the scanning, the distance is kept constant at all times between the probe 21 and the sample S surface.

Meanwhile, when the stage 16 moves in the Z-axis direction, the capacitance-type sensor 108 detects a fine movement amount of the mechanism body 86. In accordance with the detection result, calculated is an error in the Z-axis directional fine movement amount of the stage 16, thus correcting for errors in the Z-axis direction. This can operate the stage 16 linearly in the Z-axis direction.

Incidentally, a fine movement amount may be detected by the capacitance-type sensor 108 and displayed as height information of the scanning probe microscope. In this case, higher rate of scanning is possible to perform.

In this manner, a topographic image of the sample S surface can be measured by making an image through inputting to the control section, not shown, the voltage applied to the X-side, Y-side and Z-side piezoelectric elements 54, 61, 90. Meanwhile, by measuring various ones of force and physical actions acting between the probe 21 and the sample S, measurement can be made as to various pieces of physical-property information, such as of viscoelasticity, sample-S surface potential distribution, sample-S surface leak magnetic-field distribution and near-field optical images.

From the above, according to the scanning probe microscope 1 of the present embodiment, by allowing the light L inclining relative to the X, Y and Z axes to enter the reflection surface 14 from above of the C region, it is possible to effectively utilize the open space above the front end of the cantilever 20. Even in case the condenser lens 41 is arranged above the cantilever 20, the light L can be easily incident upon the reflection surface 14 without obstructed from traveling of the light L. Accordingly, measurement can be made with swiftness and accuracy by combining with the inverted microscope 8.

Meanwhile, by allowing the light L incident upon the reflection surface 14 from the C region to reflect inclining relative to the X, Y and Z axes, toward the D region, the reflected light L can easily arrive at the photodetector 121 without being obstructed from traveling.

Furthermore, where the light source 114 uses a semiconductor laser, noise occurs due to the return light from the reflection surface 14 of the cantilever 20 or from the surface of the sample S. Such return light is suppressed to reduce return-light noise. For this reason, the light from the light source can be increased in amount, to improve measurement sensitivity.

Meanwhile, because the first and second reflectors 122, 123 are provided on the base plate 68 so that the light L from the SLD 114 can be changed in traveling direction in a manner going toward the reflecting surface 14, space can be effectively utilized over the base plate 68 thus making it possible to easily reduce the size.

Furthermore, because the SLD 114, the first reflector 122, the second reflector 123, the photodetector 121 and so on are arranged nearly annularly as viewed from above, the apparatus can be structured thin. The condenser lens 41 can be arranged above the center of the annular thus utilizing the space over the base plate 68 more efficiently.

Meanwhile, because the correction glass 126 is removably provided, correction can be made swiftly and easily for the deviation between the optical-path length required for in-liquid measurement and the optical-path length required for in-the-air measurement. This eliminates the necessity of providing an optical-axis-directional movement mechanism or exchanging the cantilever holder 22 in accordance with the medium, thus making the apparatus smaller in size and improving the operationality.

Meanwhile, by the probe fine-movement mechanism 26, the probe 21 can be positively moved in the X and Y-axis directions. The probe 21 can be positively scanned with accuracy over the sample S.

Furthermore, because the probe-side through-hole 70 is provided in the probe fine-movement mechanism 26 and illumination light is to be passed through the probe-side through-hole 70, accurate measurement is possible to be performed without obstructing the travel of illumination light by the displacement detecting mechanism 112. Meanwhile, because the displacement detecting mechanism 112 can be structured thin, a condenser lens having great NA can be used. The image due to the inverted microscope 8 is provided highly resoluble and clear.

Meanwhile, because the stage opening 17 is provided in the stage fine-movement mechanism 27, the objective lens 10 can be put in further proximity to the sample S. Measurement is possible to be performed with accuracy by providing an objective lens having high NA.

Meanwhile, because the SLD 114 is provided as a light source to irradiate low-coherent light, accurate measurement can be made by suppressing the interference fringe as caused due to the interference between the reflection light from the reflection surface 14 of the cantilever 20 and the reflection light from the surface of the sample S.

Furthermore, because the cylindrical lens 119 is provided, the optical system can be corrected for astigmatism even where light is entered obliquely through the glass holder 23. This provides a spot form small in size and approximately circular, thus enabling measurement with further accuracy.

Meanwhile, because the collection lens 128 is provided, the spot reaching the photodetector 121 can be provided in such a suitable size as coming within the photodetector 121 surface thus being collected in a narrow area.

Embodiment 2

Now explanation is made in the below on a second embodiment of the invention.

Figure 11:
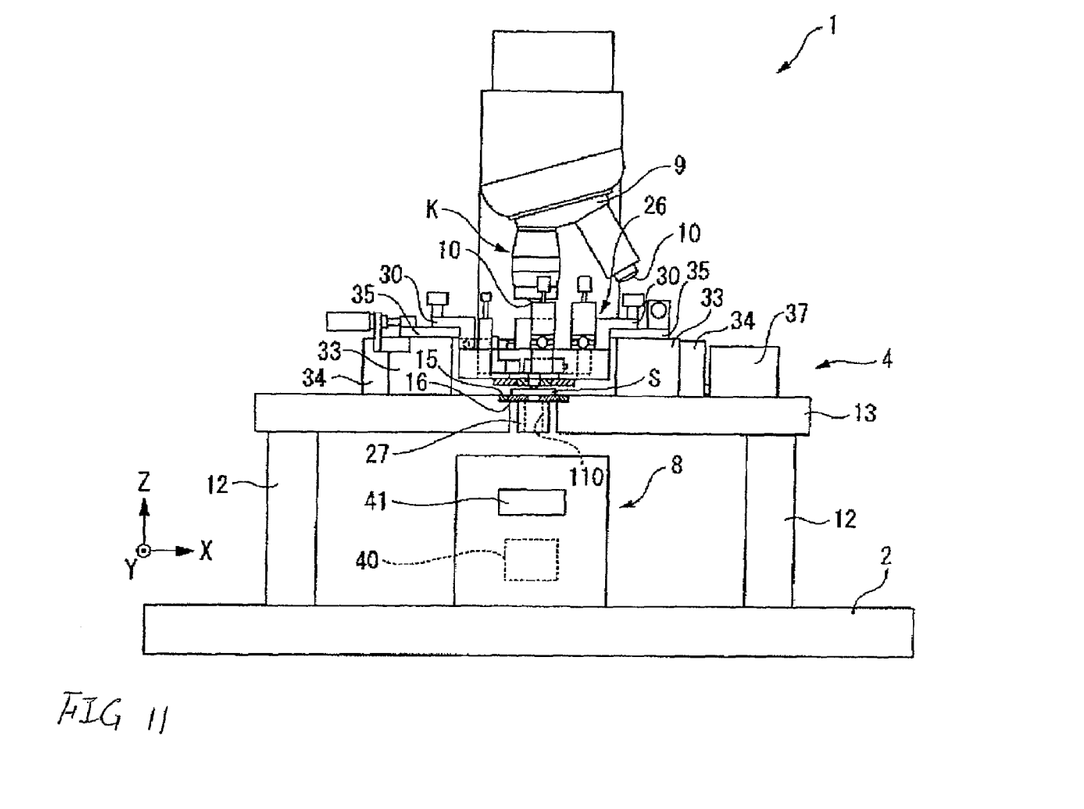
FIG. 11 is a front view showing a second embodiment of a scanning probe microscope according to the invention.

FIG. 11 shows a second embodiment of the invention.

In FIG. 11, the identical reference numeral is attached to the identical component to the element described in FIGS. 1 to 10, to omit the explanation thereof.

This embodiment is the same in basic structure as the first embodiment wherein difference lies in the following points.

Namely, the scanning probe microscope 1 in this embodiment is combined with an upright microscope 8. The upright microscope 8 is provided with a light source 40 and a condenser lens 41 above the light source 40 of a main body 3. Meanwhile, a stage fine-movement mechanism 27 is provided above the condenser lens 41. The stage fine-movement mechanism 27 is formed by a Z-side piezoelectric element 90 wherein the Z-side piezoelectric element 90 is arranged to direct to the Z-axis direction. In the Z-side piezoelectric element 90, a bore (through-hole) 110 is formed to direct to the Z-axis direction. The illumination light from the light source 40 is passed through the bore 110.

Meanwhile, an objective lens 10 is provided in an observation site K above the probe fine-movement mechanism 26. Here, the observation site K refers to a site where the cantilever 20 or the sample S is observed from above of the probe fine-movement mechanism 26. The objective lens 10 is allowed to vertically move in the observation site K. When moved down, it can be inserted in the probe-side through-hole 70.

With this structure, the illumination light from the light source 40 passes through the bore 110 and transmits through the sample S. In case the objective lens 10 is moved down into the probe-side through-hole 70, the objective lens 10 goes toward the cantilever 20 or the sample S.

From the above, because the bore 110 is provided in the stage fine-movement mechanism 27 wherein illumination light is passed through the bore 110, measurement can be conducted with accuracy without obstructing the travel of illumination light.

Meanwhile, where the SLD-based spot is positioned on the reflection surface of the cantilever, positioning can be made by observing through the objective lens 10 of an upright microscope by arranging a scatter plate between the cantilever and the sample similarly to the first embodiment. The scatter plate in this case is preferably structured by a scattering body on a reflective substrate such as a semiconductor wafer.

Because the objective lens 10 can be inserted in the probe-side through-hole 70, the objective lens 10 can be put in further proximity to the cantilever 20 or the sample S. Measurement can be conducted accurately with the provision of an objective lens having high NA.

Incidentally, in the first and second embodiments, the probe fine-movement mechanism 26 was provided as an XY scanner to finely move the cantilever 20 in the X and Y axis directions. However, this is not limitative but the prove fine-movement mechanism 26 may be used as a Z scanner to finely move the cantilever 20 in the Z axis direction. In this case, the stage 16 is moved in the X and Y axis directions by the stage fine-movement mechanism 27 as an XY scanner.

Meanwhile, there were provided the probe fine-movement mechanism 26 and the stage fine-movement mechanism 27. However, this is not limitative but a three-dimensional actuator or the like may be provided as an XYZ scanner. In this case, three-dimensional actuator may be arranged on any of the probe side and the sample side.

Meanwhile, in the embodiments, the scanning probe microscope displacement detecting mechanism was structured integrally with the scanner that finely moves the cantilever or the sample. However, it may be structured independently of the scanner. Meanwhile, the case not having a part or the entire of the XYZ scanner is included in the invention.

Meanwhile, the cantilever 20 is not limited to the elongate form but may be a bent probe, for a near-field microscope, having an optical fiber triangular in plan or circular in section that is sharpened and bent at the front end.

Meanwhile, observation was in the DFM mode. However, this is not limitative but application is possible for various modes of contact AFM.

Furthermore, the invention includes, as a microscope, a microscope based on a reflective illumination scheme besides the inverted and upright microscopes utilizing a transmission illumination scheme.

Furthermore, application is possible for a near-field microscope. Where applied for a near-field microscope, an objective lens having high NA can be arranged at a desired angle in a position where a probe apex can be observed, thus improving the excitation and efficiency of gathering near-field signals.

The invention claimed is:

1. A scanning probe microscope having a stage parallel to an X-Y plane for a sample to be placed thereon, comprising:
    a cantilever generally extending along a Y-axis at an angle inclined from the Y-axis and having a supported end and a free end, wherein the free end is positioned substantially at a Z-axis and thus defines the origin of the four quadrants of the X-Y plane, and the four quadrants are defined as a 1st quadrant, a 2nd quadrant, a 3rd quadrant and a 4th quadrant counterclockwise from the upper right quadrant;
    a light source oriented to irradiate a beam of light along a light path, wherein the light source is placed so as not to interfere with a view of at least the free end of the cantilever for observation thereof;
    a reflection surface defined at the free end of the cantilever and oriented to receive the beam of light incident downwardly from a first point located within a space defined by a Z positive area of an X-Z plane and a Y negative area of a Y-Z plane, exclusive of the planes, and further by one of the 3rd and 4th quadrants, and reflect the received beam of light upward towards a second point located within a space defined by the Z positive area of the X-Z plane and the Y negative area of the Y-Z plane, exclusive of the planes, and further by the other of the 3rd and 4th quadrants; and a photodetector configured to detect the beam of light from the reflection surface of the cantilever.

2. The scanning probe microscope according to claim 1, further comprising a reflector placed in the light path within the space defined by the Z positive area of the X-Z plane, the Y negative area of the Y-Z plane and one of the 3rd and 4th quadrants, wherein the light path is located in a light propagating plane which is located in parallel to and above the X-Y plane, and the reflector is placed in the light propagating plane outside the view of at least the free end of the cantilever and reflects the beam of light down to the free end of cantilever.

3. The scanning prove microscope according to claim 2, wherein the reflection surface is angled at about 60 degrees relative to the Z-axis and at about 48 degrees relative to the Y-axis.

4. The scanning probe microscope according to claim 1, further comprising an auxiliary reflector provided in the light propagating plane outside the view of at least the free end of the cantilever to reflect the beam of light from the light source to the reflector.

5. The scanning probe microscope according to claim 4, wherein the auxiliary reflector is placed within the space defined by the Z positive area of the X-Z plane, the Y negative area of the Y-Z plane and the 3rd quadrant.

6. The scanning probe microscope according to claim 1, wherein an optical-path-length corrector is provided along the optical path between the light source and the reflector.

7. The scanning probe microscope according to claim 1, wherein the objective lens is arranged in a position to observe at least one of a probe, the cantilever and the sample.

8. The scanning probe microscope according to claim 1, wherein the illuminator is configured to illuminate at least one of the probe, the cantilever and the sample from a desired direction.

9. The scanning probe microscope according to claim 1, further comprising a scanner configured to finely move one of the cantilever and the sample.

10. The scanning probe microscope according to claim 9, wherein the scanner has a through-hole formed therein through which the Z axis passes.

11. The scanning probe microscope according to claim 9, wherein the scanner is configured to finely move the cantilever along the X, Y and Z axes, respectively.

12. The scanning probe microscope according to claim 1, wherein the light source is a low-coherent light source.

13. The scanning probe microscope according to claim 1, wherein a cylindrical lens is provided in the optical path of the beam of light from the light source.

14. The scanning probe microscope according to claim 1, wherein a focus lens is provided to focus the beam of light reflected from the reflection surface of the cantilever onto the photodetector.

15. The scanning probe microscope according to claim 1, further comprising a scatter plate arranged between the cantilever and the stage, wherein the beam of light from the light source is scattered by the scatter plate so that the reflection surface of the cantilever can be observed through the objective lens.

16. The scanning probe microscope according to claim 1, wherein the light source is located within the space defined by the Z positive area of the X-Z plane, the Y negative area of the Y-Z plane and the 4th quadrant.

17. The scanning probe microscope according to claim 1, wherein the photodetector is located within the space defined by the Z positive area of the X-Z plane, the Y negative area of the Y-Z plane and the 4th quadrant.

18. The scanning prove microscope according to claim 1, wherein the cantilever extends at an angle of about 9 degrees relative to the Y-axis.

19. The scanning prove microscope according to claim 1, wherein the beam of light is incident upon the reflection surface at an angle of about 50 degrees relative to the Z-axis and an angle of between 0 degree and 45 degrees relative to the X-axis.

20. The scanning prove microscope according to claim 19, wherein the beam of light is incident upon the reflection surface at an angle of about 15 degrees.

* * * * *